US012693989B2

(12) United States Patent
Cui

(10) Patent No.: US 12,693,989 B2
(45) Date of Patent: Jul. 28, 2026

(54) METHOD AND DEVICE FOR DETECTING A CONNECTION OF A CHIP TO A PRINTING DEVICE

(71) Applicant: GUANGZHOU ZHONO ELECTRONIC TECHNOLOGY CO., LTD., Guangzhou (CN)

(72) Inventor: Zhishu Cui, Guangzhou (CN)

(73) Assignee: GUANGZHOU ZHONO ELECTRONIC TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/319,523

(22) Filed: May 18, 2023

(65) Prior Publication Data

US 2024/0078205 A1     Mar. 7, 2024

(30) Foreign Application Priority Data

Sep. 5, 2022    (CN) ......................... 202211076965.X

(51) Int. Cl.
G06F 13/40          (2006.01)
B41J 2/175          (2006.01)
                    (Continued)

(52) U.S. Cl.
CPC ...... G06F 13/4081 (2013.01); B41J 2/17546 (2013.01); G03G 21/1878 (2013.01);
                    (Continued)

(58) Field of Classification Search
CPC .... G06F 3/1229; G06F 3/1232; G06F 3/1235; G06F 13/4081; G06F 13/4221;
                    (Continued)

(56) References Cited

U.S. PATENT DOCUMENTS 5,168,568 A * 12/1992 Thayer .................... G06F 13/36
                                        710/125
5,564,059 A * 10/1996 Maskovyak .......... G06F 13/409
                    (Continued)

FOREIGN PATENT DOCUMENTS

CN          102407679 A       4/2012
CN          102709960        10/2012
                    (Continued)

OTHER PUBLICATIONS

Office Action from related Chinese Appln. No. 202211076965.X, dated Jan. 22, 2025. English translation attached.
                    (Continued)

*Primary Examiner* — Thomas J. Cleary

(74) *Attorney, Agent, or Firm* — Nitin Kaushik

(57)          ABSTRACT

A field of printing devices, and a method and device for detecting a connection of a chip to a printing device. A controller in the printing device obtains an actual voltage value of a bus of the printing device when it detects that a plurality of chips connected in parallel become interfacing with the bus, and compares the actual voltage value with a voltage threshold. If the actual voltage value is less than or equal to the voltage threshold, it is determined that each chip is connected to the printing device. If the actual voltage value is greater than the voltage threshold, it is determined that each chip is not connected to the printing device.

9 Claims, 5 Drawing Sheets

(51) Int. Cl.
*G03G 21/18* (2006.01)
*G06F 3/12* (2006.01)
*G06F 13/42* (2006.01)

(52) U.S. Cl.
CPC .......... *G06F 3/1232* (2013.01); *G06F 3/1235* (2013.01); *G06F 13/4221* (2013.01)

(58) Field of Classification Search
CPC .......... G03G 21/1867; G03G 21/1875; G03G 21/1878; G03G 21/1882; G03G 21/1892; B41J 2/17543; B41J 2/17546; G01R 31/66
See application file for complete search history.

(56) References Cited

U.S. PATENT DOCUMENTS

| | | | | |
|---|---|---|---|---|
| 5,612,634 | A * | 3/1997 | Mackenna | G06F 13/4081 326/82 |
| 6,158,837 | A * | 12/2000 | Hilton | B41J 2/17546 347/19 |
| 6,672,699 | B1 * | 1/2004 | Jeong | B41J 2/17546 347/49 |
| 11,176,279 | B2 * | 11/2021 | Zheng | G06F 21/73 |
| 2002/0132643 | A1 * | 9/2002 | Chang | H01Q 1/246 455/562.1 |
| 2002/0161938 | A1 * | 10/2002 | Bonomo | G06F 11/2247 714/E11.146 |
| 2003/0231915 | A1 * | 12/2003 | Jakubowski | B41J 35/36 400/76 |
| 2005/0276617 | A1 * | 12/2005 | Matsumoto | G03G 21/1875 399/13 |
| 2007/0226526 | A1 * | 9/2007 | Chapuis | G06F 1/3253 713/300 |
| 2010/0289847 | A1 * | 11/2010 | Ishizawa | G03G 15/0863 347/19 |
| 2011/0205589 | A1 * | 8/2011 | Sato | B41J 2/17546 358/1.15 |
| 2012/0056920 | A1 * | 3/2012 | Asauchi | B41J 2/17553 347/1 |
| 2012/0056954 | A1 * | 3/2012 | Asauchi | G03G 15/0863 347/86 |
| 2012/0081478 | A1 * | 4/2012 | Fujisawa | B41J 2/1753 347/86 |
| 2012/0134686 | A1 * | 5/2012 | Jones | G03G 21/1892 399/12 |
| 2012/0254050 | A1 * | 10/2012 | Scrafford | G06Q 10/00 705/318 |
| 2013/0113853 | A1 * | 5/2013 | Oe | B41J 2/17553 347/6 |
| 2013/0177326 | A1 * | 7/2013 | Hamaya | G03G 21/1875 399/12 |
| 2013/0321853 | A1 * | 12/2013 | Lee | H04N 1/4433 358/1.14 |
| 2014/0164660 | A1 * | 6/2014 | DeCesaris | G06F 13/4291 710/113 |
| 2015/0110504 | A1 * | 4/2015 | Lee | H04N 1/44 235/492 |
| 2018/0326735 | A1 * | 11/2018 | Zhang | G06F 12/1433 |
| 2019/0196750 | A1 * | 6/2019 | Duan | G06F 3/121 |
| 2020/0174963 | A1 * | 6/2020 | Panshin | H04N 1/00214 |
| 2020/0229306 | A1 * | 7/2020 | Dey | H01R 12/721 |
| 2021/0370671 | A1 * | 12/2021 | Gardner | B41J 2/04585 |

FOREIGN PATENT DOCUMENTS

| | | |
|---|---|---|
| CN | 203317892 | 12/2013 |
| CN | 105182214 | 12/2015 |
| CN | 205489698 | 8/2016 |
| CN | 111196089 | 5/2020 |

OTHER PUBLICATIONS

Office Action from related Chinese Appln. No. 202211076965.X, dated Jul. 4, 2025. English translation attached.

* cited by examiner

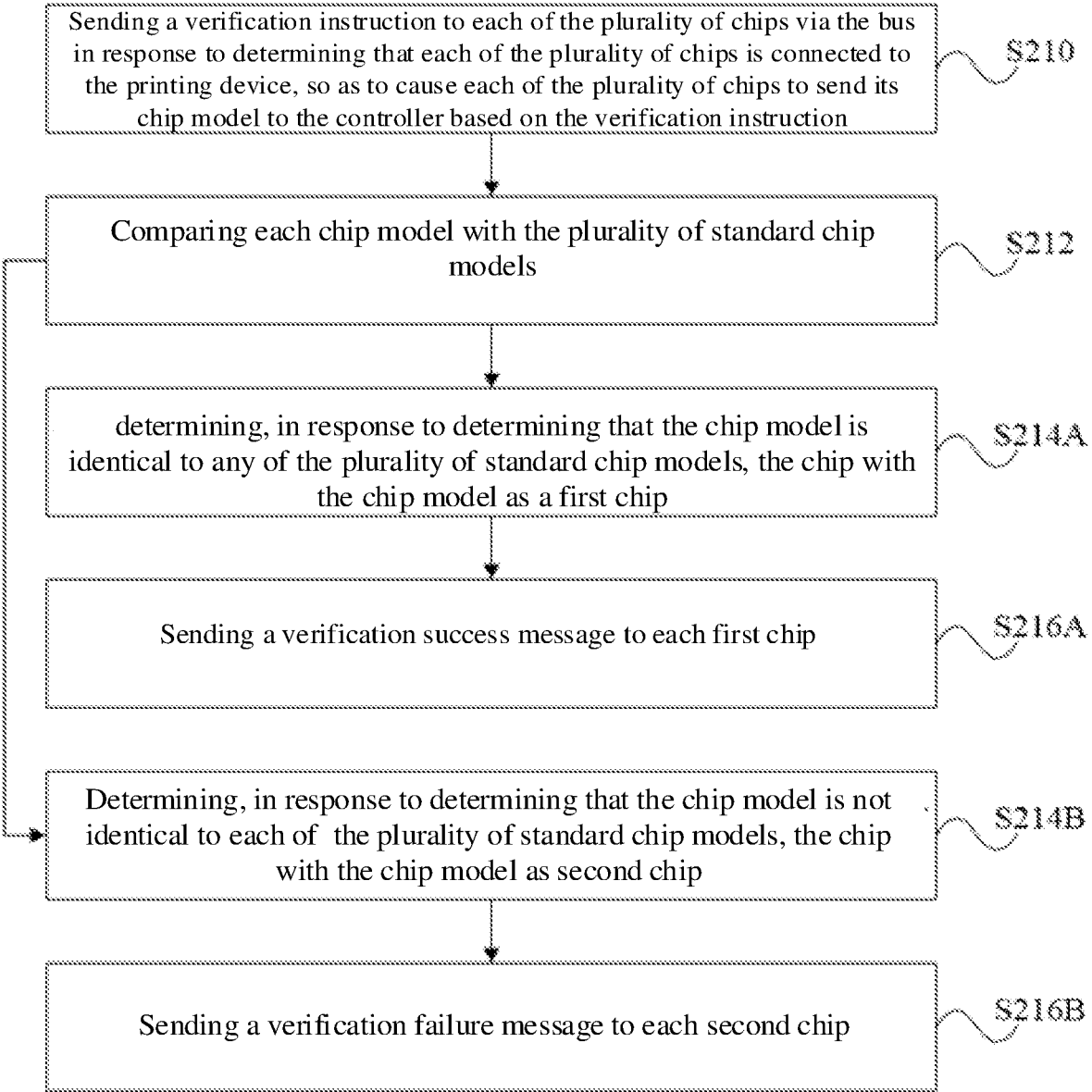

Sending a verification instruction to each of the plurality of chips via the bus in response to determining that each of the plurality of chips is connected to the printing device, so as to cause each of the plurality of chips to send its chip model to the controller based on the verification instruction ⟶ S210

Comparing each chip model with the plurality of standard chip models ⟶ S212 determining, in response to determining that the chip model is identical to any of the plurality of standard chip models, the chip with the chip model as a first chip ⟶ S214A Sending a verification success message to each first chip ⟶ S216A Determining, in response to determining that the chip model is not identical to each of the plurality of standard chip models, the chip with the chip model as second chip ⟶ S214B Sending a verification failure message to each second chip ⟶ S216B

FIG. 4

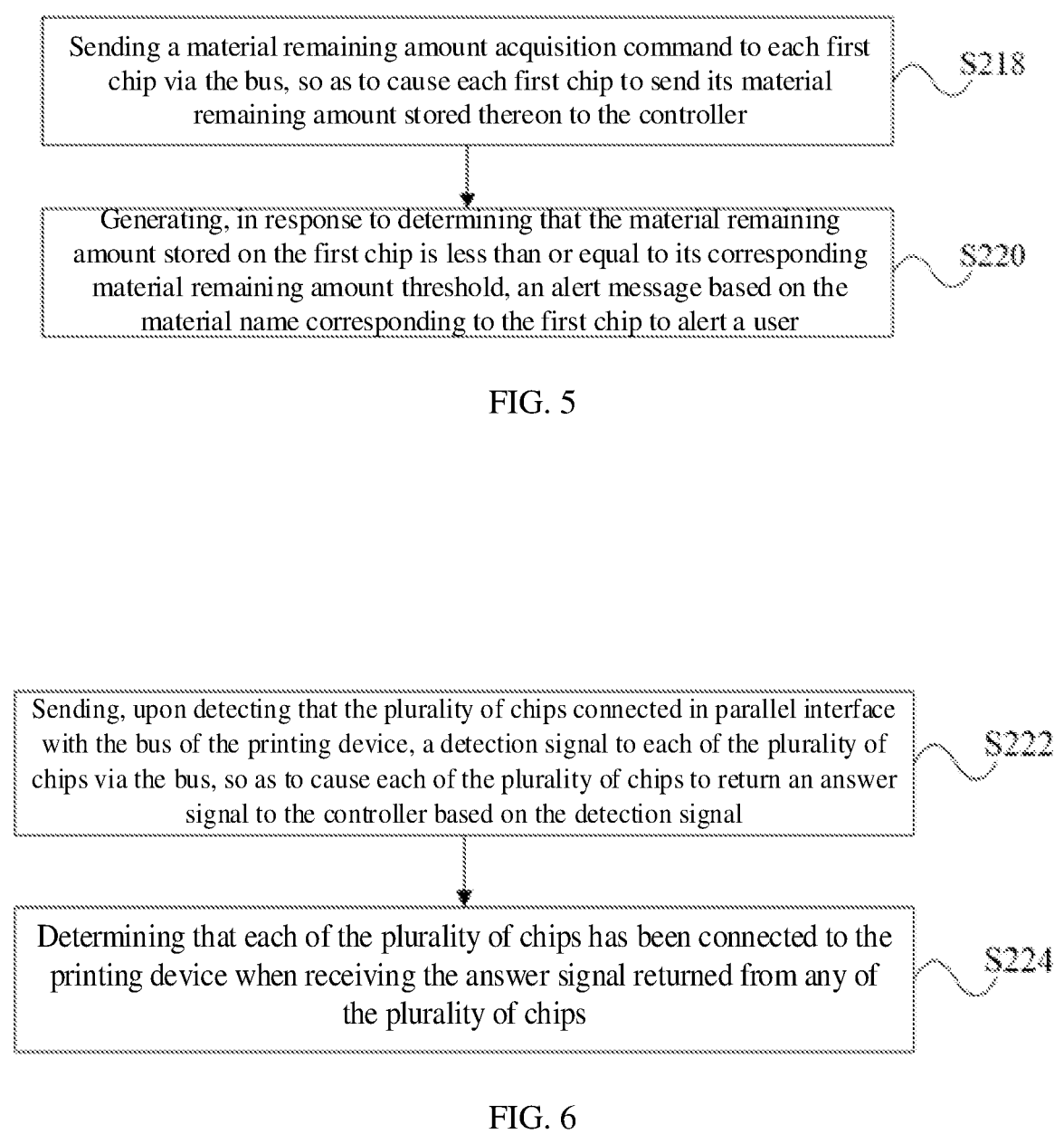

Sending a material remaining amount acquisition command to each first chip via the bus, so as to cause each first chip to send its material remaining amount stored thereon to the controller          S218

Generating, in response to determining that the material remaining amount stored on the first chip is less than or equal to its corresponding material remaining amount threshold, an alert message based on the material name corresponding to the first chip to alert a user          S220

FIG. 5

Sending, upon detecting that the plurality of chips connected in parallel interface with the bus of the printing device, a detection signal to each of the plurality of chips via the bus, so as to cause each of the plurality of chips to return an answer signal to the controller based on the detection signal          S222

Determining that each of the plurality of chips has been connected to the printing device when receiving the answer signal returned from any of the plurality of chips          S224

FIG. 6

METHOD AND DEVICE FOR DETECTING A CONNECTION OF A CHIP TO A PRINTING DEVICE

CROSS REFERENCE TO RELATED APPLICATION

The present disclosure claims priority to Chinese patent Application No. 202211076965.X entitled "A METHOD AND RELATED DEVICE FOR DETECTING A CON- NECTION OF A CHIP TO A PRINTING DEVIC" and filed by Guangzhou ZHONO Electronic Technology Co., Ltd. on Sep. 5, 2022, which is hereby incorporated by reference in its entirety.

FIELD

The present disclosure relates to the field of printing devices, and more particularly, to a method and device for detecting a connection of a chip to a printing device.

BACKGROUND

A printing device often requires replacement of a material cartridge, and the material cartridge is provided with a chip therein. For example, an inkjet printer requires replacement of an ink cartridge, and a laser printer requires replacement of a toner cartridge. When an old material cartridge is replaced with a new material cartridge, the printing device needs to detect whether it is connected to a chip on the new material cartridge. Currently, each chip is usually detected separately. However, when there are multiple chips, it will lead to long detection time and low detection efficiency.

SUMMARY

In view of the above, the purpose of the present disclosure is to provide a method and device for detecting a connection of a chip to a printing device.

In order to realize the above purpose, embodiments of the present disclosure provide the following technical solutions.

In a first aspect of the present disclosure, a method for detecting a connection of a chip to a printing device is provided. The method is applied to a controller in the printing device. The controller has a voltage threshold pre-stored thereon. The method includes: obtaining an actual voltage value of a bus of the printing device upon detecting that a plurality of chips connected in parallel become interfacing with the bus; comparing the actual voltage value with the voltage threshold; determining that each of the plurality of chips is connected to the printing device in response to determining that the actual voltage value is less than or equal to the voltage threshold; and determining that each of the plurality of chips is not connected to the printing device in response to determining that the actual voltage value is greater than the voltage threshold.

In an optional embodiment, each of the plurality of chips has a chip model, and the controller has a plurality of standard chip models pre-stored thereon. The method further includes: sending a verification instruction to each of the plurality of chips via the bus in response to determining that each of the plurality of chips is connected to the printing device, so as to cause each of the plurality of chips to send its chip model to the controller based on the verification instruction; comparing each chip model with the plurality of standard chip models; determining, in response to determin- ing that the chip model is identical to any of the plurality of standard chip models, the chip with the chip model as a first chip; and sending a verification success message to each first chip.

In an optional embodiment, the method further includes: determining, in response to determining that the chip model is not identical to each of the plurality of standard chip models, the chip with the chip model as second chip; and sending a verification failure message to each second chip.

In an optional embodiment, the controller further has a material name and a material remaining amount threshold corresponding to each first chip pre-stored thereon. Each first chip has a material remaining amount stored thereon. The method further includes: sending a material remaining amount acquisition command to each first chip via the bus, so as to cause each first chip to send its material remaining amount stored thereon to the controller; and generating, in response to determining that the material remaining amount stored on the first chip is less than or equal to its corre- sponding material remaining amount threshold, an alert message based on the material name corresponding to the first chip to alert a user.

In an optional embodiment, the method further includes: sending, upon detecting that the plurality of chips connected in parallel become interfacing with the bus of the printing device, a detection signal to each of the plurality of chips via the bus, so as to cause each of the plurality of chips to return an answer signal to the controller based on the detection signal; and determining that each of the plurality of chips is connected to the printing device when receiving the answer signal returned from any of the plurality of chips.

In a second aspect of the present disclosure, a device for detecting a connection of a chip to a printing device is disclosed. The device is applied to a controller in the printing device, and the controller has a voltage threshold pre-stored thereon. The device includes an obtaining module and a connection detecting module. The obtaining module is con- figured to obtain an actual voltage value of a bus of the printing device upon detecting that a plurality of chips connected in parallel become interfacing with the bus. The connection detecting module is configured to: compare the actual voltage value with the voltage threshold value; deter- mine that each of the plurality of chips is connected to the printing device in response to determining that the actual voltage value is less than or equal to the voltage threshold; and determine that each of the plurality of chips is not connected to the printing device in response to determining that the actual voltage value is greater than the voltage threshold.

In an optional embodiment, each of the plurality of chips has a chip model, the controller has a plurality of standard chip models pre-stored thereon. The device further com- prises a verification module. The verification module is configured to: send a verification instruction to each of the plurality of chips via the bus in response to determining that each of the plurality of chips is connected to the printing device, so as to cause each of the plurality of chips to send its chip model to the controller based on the verification instruction; compare each chip model with the plurality of standard chip models; determine, in response to determining that the chip model is identical to any of the plurality of standard chip models, the chip with the chip model as a first chip; and send a verification success message to each first chip.

In an optional embodiment, the verification module is further configured to: determine, in response to determining that the chip model is not identical to each of the plurality of standard chip models, the chip with the chip model as second chip; and send a verification failure message to each second chip.

In a third aspect of the present disclosure, an printing device including a bus and a controller is provided. The controller is configured to implement the method according to any of the above embodiments.

In a fourth aspect of the present disclosure, a non-transitory storage medium having a computer program stored thereon is provided. The computer program, when executed by a processor, implements the method according to any of the above embodiments.

The present disclosure provides a method and a device for detecting a connection of a chip to a printing device. A controller in the printing device obtains an actual voltage value of a bus of the printing device when it detects that a plurality of chips connected in parallel become interfacing with the bus, and compares the actual voltage value with a voltage threshold. If the actual voltage value is less than or equal to the voltage threshold, it is determined that each chip is connected to the printing device. If the actual voltage value is greater than the voltage threshold, it is determined that each chip is not connected to the printing device. By obtaining the voltage of the bus when the plurality of chips connected in parallel become interfacing with the bus so as to detect whether each chip is connected to the printing device, it is possible to avoid detecting each chip individually, thus improving detection efficiency and ensuring that each chip is stably connected to the printing device.

In order to make the above-mentioned objects, features and advantages of the present disclosure more obvious and easier to understand, the detailed description of some embodiments are provided below with reference to the drawings.

BRIEF DESCRIPTION OF DRAWINGS

In order to more clearly illustrate the technical solution of embodiments of the present disclosure, the drawings as required for the embodiments will be briefly described below. It should be understood that the following drawings only illustrate some embodiments of the present disclosure and therefore should not be regarded as limiting the scope. In addition, other relevant drawings may be obtained on the basis of these drawings by a person of ordinary skill in the art without any creative effort.

FIG. 4 illustrates another schematic flow diagram of a method for detecting a connection of a chip to a printing device according to an embodiment of the present disclosure;

FIG. 5 illustrates still another schematic flow diagram of a method for detecting a connection of a chip to a printing device according to an embodiment of the present disclosure;

FIG. 6 illustrates yet another schematic flow diagram of a method for detecting a connection of a chip to a printing device according to an embodiment of the present disclosure.

DETAILED DESCRIPTION

The technical solutions in embodiments of the present disclosure will be clearly and completely described below in connection with the accompanying drawings in the embodiments of the present disclosure. Obviously, the embodiments described are only a part of and not all of the embodiments of the present disclosure. The components of the embodiments of the disclosure generally described and illustrated in the accompanying drawings herein may be arranged and designed in a variety of different configurations.

Accordingly, the following detailed description of embodiments of the present disclosure provided in the accompanying drawings is not intended to limit the protection scope of the present disclosure, but merely indicates selected embodiments of the present disclosure. Based on the embodiments of the present disclosure, all other embodiments obtained by a person skilled in the art without any creative labor fall within the protection scope of the present disclosure.

It should be noted that relational terms such as "first" and "second" are used only to distinguish one entity or operation from another entity or operation, and do not necessarily require or imply any such actual relationship or sequence between these entities or operations. Further, the terms "include," "comprise," or any other variation thereof are intended to cover non-exclusive inclusion in such a manner that a process, method, article, or apparatus including a set of elements includes not only those elements, but also other elements not explicitly listed or other elements that are inherent to the process, method, article, or apparatus. Without any further limitation, an element defined by the statement "including one" does not preclude the existence of an additional identical element in the process, method, article or apparatus including the one element.

Figure 1:
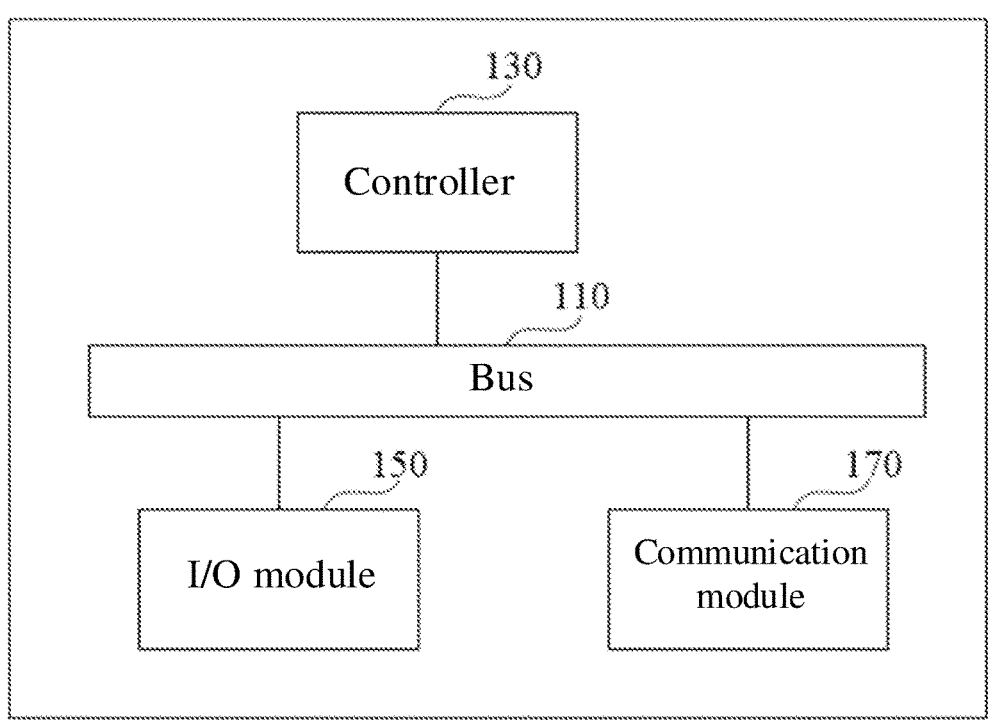
FIG. 1 illustrates a schematic block diagram of a printing device according to an embodiment of the present disclosure.

Referring to FIG. 1, a schematic block diagram of a printing device according to an embodiment of the present disclosure is shown. The printing device includes a bus 110, a controller 130, an I/O (Input/Output) module 150, and a communication module 170.

The bus 110 may be a circuit that connects the above elements to each other and transfers signals among the above elements.

The controller 130 includes a processing module and a memory module. The processing module may receive commands from other elements described above via the bus 110, may interpret the received commands, and may perform calculations or data processing based on the interpreted commands. The memory module may store commands or data received from or generated by the processing module or other elements.

The processing module may be an integrated circuit chip with signal processing capability. The processing module may be a Central Processing Unit (CPU), a Network Processor (NP), etc. Alternatively, the processing module may be a Digital Signal Processor (DSP), an Application Specific Integrated Circuit (ASIC), an Filed Programmable Gate Array (FPGA) or other programmable logic device, a discrete gate or a transistor logic device, or a discrete hardware component.

The memory module may be, but is not limited to, a Random Access Memory (RAM), a Read Only Memory (ROM), a Programmable Read Only Memory (PROM), an Erasable Programmable Read Only Memory (EPROM), and an Electric Erasable Programmable Read Only Memory (EEPROM).

The I/O module 150 can receive a command or data input by a user via an input-output means (e.g., a sensor, a keypad, a touch screen, etc.) and can transmit the received command or data to the processing module or the memory module via the bus 110. The I/O module 150 is further configured to display various information (e.g., multimedia data, text data) received from, stored by, or processed by the above elements, and can display videos, images, data or the like to the user.

The communication module 170 can be used to communicate with other node devices for signaling or data.

It will be appreciated that the structure shown in FIG. 1 is only a schematic representation of the structure of the printing device. The printing device may include more or fewer elements than those shown in FIG. 1, or have a different configuration from that shown in FIG. 1. The elements shown in FIG. 1 may be implemented using a hardware, a software, or a combination thereof.

The printing device provided by embodiments of the present disclosure may be an inkjet printer, a laser printer, a pin printer, etc. The printing device is not limited to any of these examples of the present disclosure.

Figure 2:
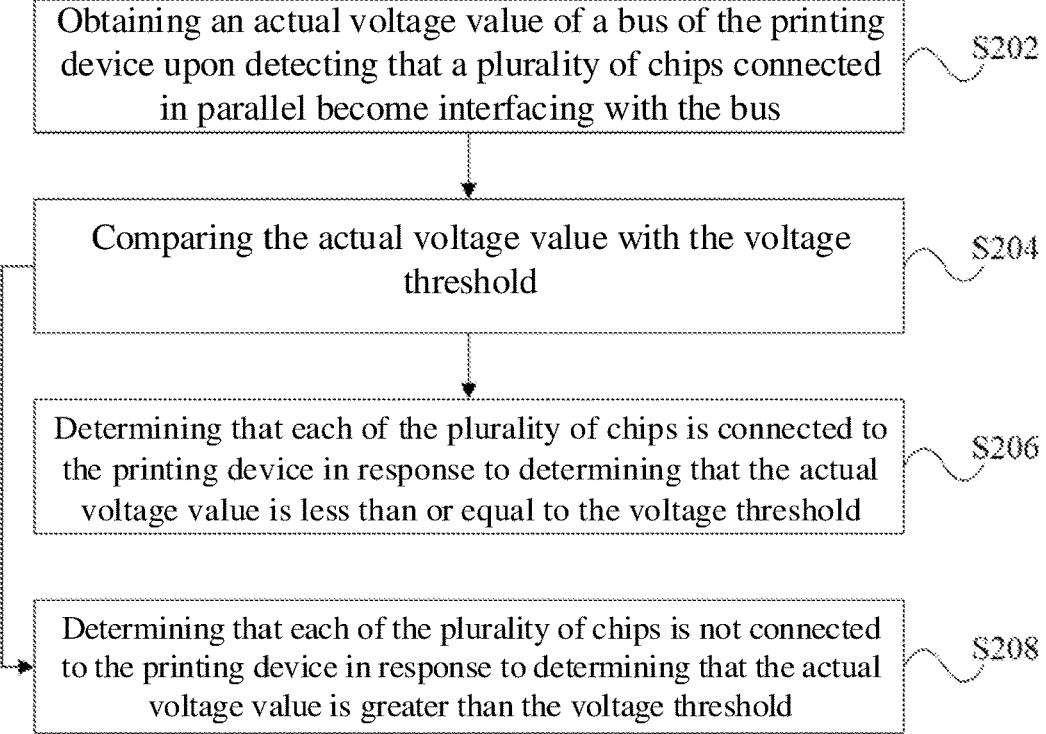
FIG. 2 illustrates a schematic flow diagram of a method for detecting a connection of a chip to a printing device according to an embodiment of the present disclosure.

With reference to FIG. 2, FIG. 2 is a schematic flowchart of a method for detecting a connection of a chip to a printing device according to an embodiment of the present disclosure.

At step S202, an actual voltage value of a bus of the printing device is obtained upon detecting that a plurality of chips connected in parallel become interfacing with the bus.

In this embodiment, when an original material of the printing device is used up, a material cartridge accommodating the original material needs to be replaced. At this time, because a material cartridge is provided with one or more chips thereon, a plurality of chips can be connected in parallel and then can be connected to the bus of the printing device. When a controller detects that a plurality of chips connected in parallel become interfacing with the bus, i.e., become electrically connecting with the bus, it detects an electrical parameter, i.e., the parameter when the chips are powered on, so as to obtain an actual voltage value of the bus.

At step 204, the actual voltage value is compared with a voltage threshold.

In this embodiment, the controller has a voltage threshold pre-stored thereon. The voltage threshold can be understood as a threshold for detecting whether the plurality of chips connected in parallel are connected to the printing device.

After the actual voltage value of the bus is obtained when the plurality of chips connected in parallel become interfacing with the bus, the controller compares the actual voltage value with the voltage threshold to determine whether the plurality of chips are connected to the printing device. Determining whether the plurality of chips are connected to the printing device can be interpreted as detecting whether pins of each chip are stably connected to contacts of the printing device.

At step S206, in response to determining that the actual voltage value is less than or equal to the voltage threshold, it is determined that each of the plurality of chips is connected to the printing device.

At step S208, in response to determining that the actual voltage value is greater than the voltage threshold, it is determined that each of the plurality of chips is not connected to the printing device.

In this embodiment, the controller obtains a comparison result by comparing the actual voltage value with the voltage threshold. If the comparison result is that the actual voltage value is less than or equal to the voltage threshold, it means that the plurality of chips connected in parallel are successfully connected to the bus and a current loop is formed. Therefore, it is determined that each chip is connected to the printing device. If the comparison result is that the actual voltage value is greater than the voltage threshold, it means that the plurality of chips connected in parallel fail to be connected to the bus and a current loop is not formed. Therefore, it is determined that each chip is not connected to the printing device.

Alternatively, other electrical parameters such as a current value can be used to detect the connection of the chip to the printing device. For example, the controller can pre-store a current threshold. When it is detected that a plurality of chips connected in parallel become interfacing with the bus of the printing device, an actual current value of the bus is obtained. The actual current value is compared with the current threshold. In response to determining that the actual current value is greater than or equal to the current threshold, it is determined that each chip is connected to the printing device. In response to determining that the actual current value is less than the current threshold, it is determined that each chip is not connected to the printing device.

Figure 3:
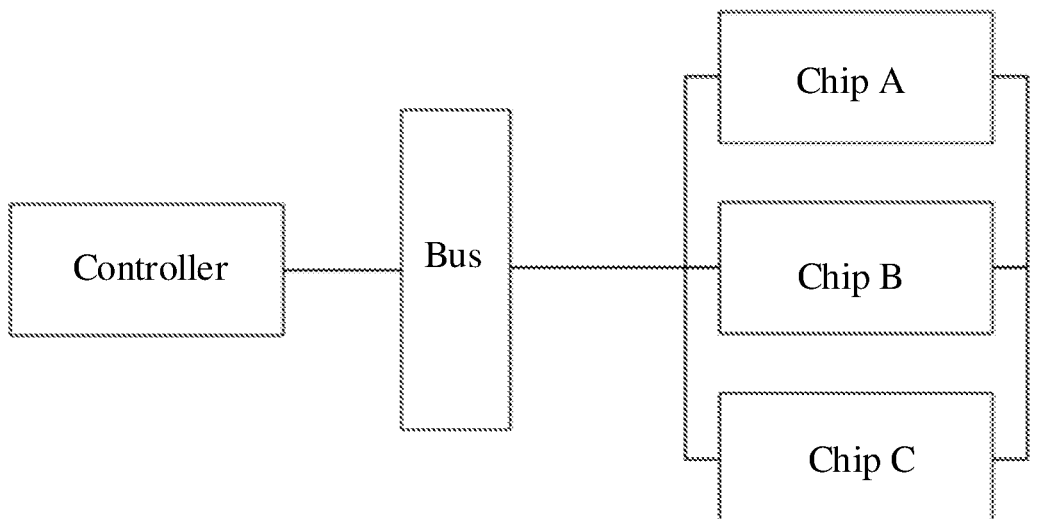
FIG. 3 illustrates an exemplary diagram of a method for detecting a connection of a chip to a printing device according to an embodiment of the present disclosure.

It should be understood that the electrical parameters of the embodiments of the present disclosure are not limited to the voltage value and the current value. and other electrical parameters can be used according to an actual situation. It is determined that each chip is connected to the printing device as long as the actual electrical parameter obtained falls within a preset range of the electrical parameter. For ease of understanding, an exemplary diagram is provided for the implementation of the present disclosure. Referring to FIG. 3, the controller, the bus and three chips connected in parallel, i.e., chip A, chip B and chip C, are included. For ease of description, these three chips connected in parallel may be referred to as a chipset. The controller pre-stores a voltage threshold of 1V.

The controller detects that a voltage value of the bus is 5V before the chipset becomes interface with the bus. The controller obtains that the actual voltage value of the bus is 0.8V when detecting that the chipset becomes interface with the bus.

Then the controller compares the actual voltage value and the voltage threshold, and obtains a comparison result that the actual voltage value of 0.8V is less than the voltage threshold of 1V The comparison result means that a voltage difference is generated on the bus and a current loop is formed, i.e., the chipset is successfully connected to the bus. Since the three chips of the chipset are connected in parallel, each of the chip A, the chip B and the chip C in the chipset is connected to the printing device.

It can be seen that based on the above steps, the controller in the printing device obtains the actual voltage value of the bus when detecting that a plurality of chips connected in parallel become interfacing with the bus of the printing device, and compares the actual voltage value with the voltage threshold, determines that each chip is connected to the printing device in response to determining that the actual voltage value is less than or equal to the voltage threshold, and determines that each chip is not connected to the printing device in response to determining that the actual voltage value is greater than the voltage threshold. By obtaining the voltage of a plurality of chips connected in parallel when the plurality of chips become interfacing with the bus so as to detect whether each chip is connected to the printing device, it avoids testing each chip individually, thus improving the detection efficiency and ensuring that each chip is stably connected to the printing device Optionally, after determining that each chip is connected to the printing device, the printing device can verify each chip. Therefore, with reference to FIG. 4, an embodiment of the present disclosure provides a possible implementation which includes the following steps.

At step S210, in response to determining that each of the plurality of chips is connected to the printing device, a verification instruction is sent to each of the plurality of chips via the bus, so as to cause each of the plurality of chips to send its chip model to the controller based on the verification instruction.

It should be noted that, each chip has a chip model. The controller pre-stores a plurality of standard chip models. The standard chip model can be understood as the chip model that matches the print device.

In this embodiment, when it is determined that each chip is connected to the printing device, the controller can send a verification instruction to each chip via the bus to verify each chip. Each chip sends its chip model to the controller based on the received verification instruction, and the controller receives the chip model of each chip.

At step S212, each chip model is compared with the plurality of standard chip models.

In this embodiment, based on each received chip model, the controller compares the chip model with the plurality of pre-stored standard chip models, and obtains a comparison result of the chip model. In this way, the comparison result of each chip model is obtained.

At step S214A, in response to determining that the chip model is identical to any of the plurality of standard chip models, the chip with the chip model is determined as a first chip.

At step S216A, a verification success message is sent to each first chip.

In this embodiment, if the comparison result is that the chip model is identical to any of the plurality of standard chip models, it indicates that the chip model matches the printing device, and the chip with the chip model is used as a first chip, i.e., a chip that matches the printing device. Then, a verification success message is sent to each first chip, i.e., the printing device matches each first chip successfully and can perform data interaction.

At step S214B, in response to determining that the chip model is not identical to each of the plurality of standard chip models, the chip with the chip model is determined as a second chip.

At step S216B, a verification failure message is sent to each second chip.

In this embodiment, if the comparison result is that the chip model is not identical to each standard chip model, it indicates that the chip model does not match the printing device, and the chip with the chip model is used as a second chip, i.e., a chip that does not match the printing device. Then a verification failure message is sent to each second chip, i.e., the printing device fails to match each second chip and cannot perform data interaction.

It can be understood that a chip can be verified using a verification algorithm after it is connected to the printing device, for example, an unidirectional verification algorithm, a bidirectional verification algorithm, a symmetric algorithm, an asymmetric algorithm, a compression algorithm, a custom algorithm, etc. The verification algorithm can also be used to verify the legitimacy of the chip and data availability.

Optionally, after the printing device verifies the chip, it can perform data interaction with the successfully verified chip to detect a remaining material amount. Thus, with reference to FIG. 5, an embodiment of the present disclosure provides a possible implementation including the following steps after step S216A.

At step S218, a material remaining amount acquisition command is sent to each first chip via the bus, so as to cause each first chip to send its material remaining amount stored thereon to the controller.

It can be understood that the controller also pre-stores a material name and a material remaining amount threshold corresponding to each standard chip model.

In this embodiment, the first chip periodically determines the usage of the material in its corresponding material cartridge at a set time interval, and stores an obtained material remaining amount.

The controller sends the material remaining amount acquisition command to each first chip via the bus. Each first chip sends its own stored material remaining amount to the controller based on the received material remaining amount acquisition command. The controller receives the material remaining amount stored by each first chip At step S220, in response to determining that the material remaining amount stored on the first chip is less than or equal to its corresponding material remaining amount threshold, an alert message is generated based on the material name corresponding to the first chip to alert a user.

In this embodiment, the controller performs a consumable material condition detection based on the received material remaining amount stored in each first chip. For each first chip, a target chip model that is identical to the chip model of this first chip is determined from all standard chip models. Then, the material remaining amount stored in this first chip is compared with the material remaining amount threshold corresponding to that target chip model.

If the remaining material amount stored in the first chip is less than or equal to the material remaining amount threshold corresponding to the target chip model, an alert message is generated based on the material name corresponding to the target chip model. The alert message is used to remind the user that the remaining amount of the material is low and a new material cartridge may need to be used.

It can be understood that the first chip can further store information such as capacity, area, etc. The printing device can obtain such information through data interaction with the first chip.

Alternatively, with reference to FIG. 6, an embodiment of the present disclosure provides another implementation of detecting a connection of a chip to a printing device.

At step S222, in response to detecting that a plurality of chips connected in parallel become interfacing with a bus of the printing device, a detection signal is sent to each of the plurality of chips via the bus, so as to make each of the plurality of chips returns an answer signal to the controller based on the detection signal.

At step S224, in response to receiving the answer signal returned from any of the plurality of chips, it is determined that each of the plurality of chips is connected to the printing device.

In this embodiment, when the plurality of chips connected in parallel become interfacing with the bus of the printing device, the controller detects each chip and sends a detection signal to each chip via the bus to detect whether a current loop is formed.

Each chip sends an answer signal to the controller based on the received detection signal. If the controller receives the answer signal from any of the chips, it indicates that a current loop is formed and it can determine that each chip is connected to the print device.

For the sake of understanding, the following two examples will be illustrated with reference to FIG. 3.

In the first example, in response to detecting that the chipset, i.e., chips A, B and C connected in parallel, become interfacing with the bus, the controller sends a detection signal to the chipset at time instant T1, T2 and T3 respectively to detect whether a current loop is formed. That is, the three chips are detected at the same time at T1, are detected at the same time at T2 and are detected at the same time at T3.

If in any detection process, the controller receives an answer signal returned from a chip, it indicates that the controller is connected to the chipset. Since the chips A, B and C in the chipset are connected in parallel, that is, the controller and the chip A form a current loop, the controller and the chip B form a current loop, and the controller and the chip C form a current loop, it is decided that each of the chip A, the chip B and the chip C is stably connected to the printing device.

It can be seen that, by connecting the chips in parallel, regardless of any chip, as long as one chip returns an answer signal to the controller during the detection period, it indicates that each chip forms a current loop with the controller, i.e., each chip is stably connected to the printing device.

In the second example, the connection detection on all chips can be performed by a more reliable chip. For example, the chip A in FIG. 3 can be used as a designated detection chip, which is more reliable and has stronger functionality than other chips. When the controller detects that the chipset, i.e., the chips A, B and C connected in parallel, becomes interfacing with the bus, it sends a detection signal to the chip A at time instant T1, T2 and T3 respectively to detect whether a current loop is formed.

If the chip A returns an answer signal at T1, T2 and T3, then chip A forms a current loop with the controller. Since the chips B and C are connected in parallel with the chip A, each of the chips B and C also forms a current loop with the controller, and it is decided that the chips A, B and C are all stably connected to the printing device. It can be seen that by connecting the chips in parallel, the connection detection can be performed on more than one chip based on one chip. At this time, as long as the chip being detected and the controller constitute a current loop, each chip and the controller constitutes a current loop, that is, each chip is stably connected to the printing device, simplifying the detection process.

Figure 7:
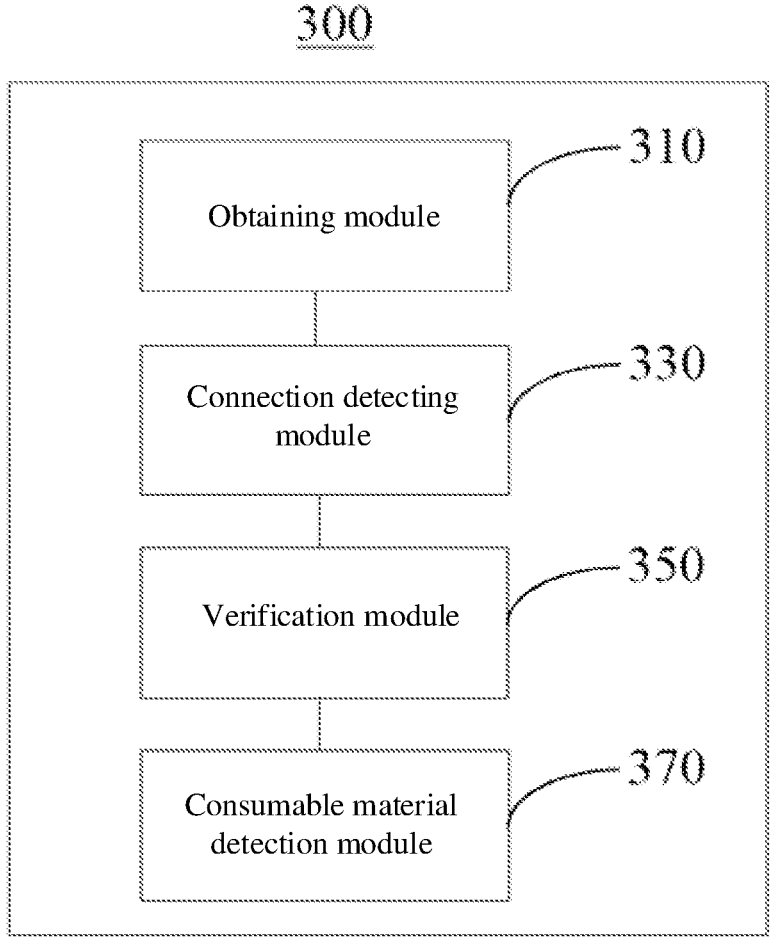
FIG. 7 illustrates a functional block diagram of a device for detecting a connection of a chip to a printing device according to an embodiment of the present disclosure.

In order to perform the corresponding steps in the above embodiments and in each possible way, an implementation of a device for detecting a connection of a chip to a printing device is provided below. Referring to FIG. 7 which shows a functional module diagram of a device 300 for detecting a connection of a chip to a printing device provided according to an embodiment of the present disclosure. It should be noted that the basic principle and the resulting technical effect of the device 300 for detecting the connection of the chip to the printing device provided by this embodiment are the same as those of the above embodiment. For a brief description, the corresponding contents of the above embodiment can be referred to when not mentioned in this embodiment. The device 300 for detecting the connection of the chip to the printing device includes an obtaining module 310 and a connection detecting module 330.

The obtaining module 310 is configured to obtain an actual voltage value of a bus of the printing device upon detecting that a plurality of chips connected in parallel become interfacing with the bus.

The connection detecting module 330 is configured to: compare the actual voltage value with a voltage threshold; determine that each of the plurality of chips is connected to the printing device in response to determining that the actual voltage value is less than or equal to the voltage threshold; and determine that each of the plurality of chips is not connected to the printing device in response to determining that the actual voltage value is greater than the voltage threshold.

Optionally, the connection detecting module 330 for the chip and the printing device further includes a verification module 350. The verification module 350 is configured to: send a verification instruction to each of the plurality of chips via the bus in response to determining that each of the plurality of chips is connected to the printing device, so as to cause each of the plurality of chips to send its chip model to the controller based on the verification instruction; compare each chip model with the plurality of standard chip models; determine, in response to determining that the chip model is identical to any of the plurality of standard chip models, the chip with the chip model as a first chip; and send a verification success message to each first chip.

Optionally, the verification module 350 is further configured to: determine, in response to determining that the chip model is not identical to each of the plurality of standard chip models, the chip with the chip model as a second chip; and send a verification failure message to each second chip.

Optionally, the device 300 for detecting the connection of the chip to the printing device further includes a consumable material detection module 370. The consumable material detection module 370 is configured to: send a material remaining amount acquisition command to each first chip via the bus, so as to cause each first chip to send its material remaining amount stored thereon to the controller; and generate, in response to determining that the material remaining amount stored on the first chip is less than or equal to its corresponding material remaining amount threshold, an alert message based on the material name corresponding to the first chip to alert a user.

Optionally, the obtaining module 310 is further configured to: send, upon detecting that the plurality of chips connected in parallel become interfacing with the bus of the printing device, a detection signal to each of the plurality of chips via the bus, so as to cause each of the plurality of chips to return an answer signal to the controller based on the detection signal; and determine that each of the plurality of chips is connected to the printing device when receiving the answer signal returned from any of the plurality of chips.

An embodiment of the present disclosure further provides a printing device including a bus and a controller. The controller is configured to implement the method of detecting the connection of the chip and the printing device according to any of the above embodiments.

An embodiment of the present disclosure further provides a non-transitory storage medium having a computer program stored thereon. The computer program, when executed by a processor, implements the method of detecting the connection of the chip and the printing device according to any of the above embodiments.

To sum up, the present disclosure provides a method and a device for detecting a connection of a chip to a printing device. A controller in the printing device obtains an actual voltage value of a bus of the printing device when it detects that a plurality of chips connected in parallel become interfacing with the bus, and compares the actual voltage value with a voltage threshold. If the actual voltage value is less than or equal to the voltage threshold, it is determined that each chip is connected to the printing device. If the actual voltage value is greater than the voltage threshold, it is determined that each chip is not connected to the printing device. By obtaining the voltage of the bus when the plurality of chips connected in parallel become interfacing with the bus so as to detect whether each chip is connected to the printing device, it is possible to avoid detecting each chip individually, thus improving detection efficiency and ensuring that each chip is stably connected to the printing device. It is also possible to perform a verification after determining that the chip is connected to the printing device, so as to facilitate data interaction of the chip that is successfully verified with the printing device. At the same time, it is also possible to detect the material remaining amount through the data interaction between the printing device and the validated chip, so that an alert message can be generated to remind the user when the material remaining amount is low, thus improving the user experience.

In some embodiments according to the present disclosure, it should be understood that the disclosed device and method may also be implemented in other ways. The embodiments of the device described above are merely schematic. For example, the flowcharts and block diagrams in the accompanying drawings show the possible implementations of the architecture, functionality, and operation of the device, the method, and the computer program product according to several embodiments of the present disclosure. In this regard, each box in the flowchart or block diagram may represent a module, a program segment or a part of code. The module, the program segment or the part of code contains one or more executable instructions for implementing a prescribed logical function. It should also be noted that in some implementations as replacements, the functions indicated in the boxes may occur in a different order than that indicated in the accompanying drawings. For example, two consecutive boxes can actually be executed substantially in parallel, and they can sometimes be executed in the opposite order, depending on the function involved. It should also be noted that each box in the block diagram and/or flowchart, and a combination of boxes in the block diagram and/or the flowchart, may be implemented with a dedicated hardware-based system that performs a specified function or action, or may be implemented with a combination of a dedicated hardware and computer instructions.

In addition, each functional module in each embodiment of the present disclosure may be integrated together to form an integral part, or each module may exist separately, or two or more modules may be integrated as an integral part.

The functional module, when implemented in the form of a software functional module and sold or used as a standalone product, may be stored in a computer readable storage medium. Based on this understanding, the technical solution of the present disclosure or a part of the technical solution that essentially contributes to the prior art may be embodied in the form of a computer software product. The computer software product is stored in a storage medium, and includes a number of instructions to enable a computer device (which may be a personal computer, a server, or a network device, etc.) to perform all or some of the steps of the method described in various embodiments of the present invention. The storage media includes: a USB flash disk, a removable hard disk, Read-Only Memory (ROM), a Random Access Memory (RAM), a disk or CD-ROM, and other media that can store program codes.

The above embodiments are only preferred embodiments of the present disclosure, and are not intended to limit the present disclosure. Various modifications and variations to the present disclosure are possible for those skilled in the art. Any modification, equivalent replacement, improvement, etc. made within the spirit and principles of the present disclosure shall be included in the scope of protection of the present disclosure.

What is claimed is:

1. A method for detecting a connection of a chip to a printer, applied to a controller in the printer, the controller having a voltage threshold pre-stored thereon, wherein the method comprises:

obtaining an actual voltage value of a bus of the printer upon detecting that a plurality of chips connected in parallel become electrically interfacing with the bus, wherein the bus has a communication function and is configured to transfer signals between the plurality of chips and the controller of the printer both for connection detection and for subsequent data interaction, and wherein the actual voltage value is generated by a current loop formed between the plurality of chips and the controller via the bus;

comparing the actual voltage value with the voltage threshold;

determining, based on a result of the comparing and using the actual voltage value of the bus to determine a connection state of all of the plurality of chips without individually detecting each of the plurality of chips, comprising:

determining that each of the plurality of chips is connected to the printer in response to determining that the actual voltage value is less than or equal to the voltage threshold; and determining that each of the plurality of chips is not connected to the printer in response to determining that the actual voltage value is greater than the voltage threshold;

wherein each of the plurality of chips has a chip model, the controller has a plurality of standard chip models pre-stored thereon, and the method further comprises:

sending a verification instruction to each of the plurality of chips via the bus in response to determining that each of the plurality of chips is connected to the printer, so as to cause each of the plurality of chips to send its chip model to the controller based on the verification instruction;

comparing each chip model with the plurality of standard chip models;

determining, in response to determining that the chip model is identical to any of the plurality of standard chip models, the chip with the chip model as a first chip; and sending a verification success message to each first chip to allow the chip and the printer to perform data interaction with each other.

2. The method according to claim 1, wherein the method further comprises:

determining, in response to determining that the chip model is not identical to each of the plurality of standard chip models, the chip with the chip model as second chip; and sending a verification failure message to each second chip.

3. The method according to claim 1, wherein the controller further has a material name and a material remaining amount threshold corresponding to each first chip pre-stored thereon, each first chip has a material remaining amount stored thereon, and the method further comprises:

sending a material remaining amount acquisition command to each first chip via the bus, so as to cause each first chip to send its material remaining amount stored thereon to the controller; and generating, in response to determining that the material remaining amount stored on the first chip is less than or equal to its corresponding material remaining amount threshold, an alert message based on the material name corresponding to the first chip to alert a user.

4. A printer comprising a bus and a controller, wherein the controller is configured to:

obtain an actual voltage value of a bus of the printer upon detecting that a plurality of chips connected in parallel become electrically interfacing with the bus, wherein the bus has a communication function and is configured to transfer signals between the plurality of chips and the controller of the printer both for connection detection and for subsequent data interaction, and wherein the actual voltage value is generated by a current loop formed between the plurality of chips and the controller via the bus;

compare the actual voltage value with the voltage threshold;

determining, based on a result of the comparing and using the actual voltage value of the bus to determine a connection state of all of the plurality of chips without individually detecting each of the plurality of chips, comprising:

determine that each of the plurality of chips is connected to the printer in response to determining that the actual voltage value is less than or equal to the voltage threshold; and determine that each of the plurality of chips is not connected to the printer in response to determining that the actual voltage value is greater than the voltage threshold;

wherein each of the plurality of chips has a chip model, the controller has a plurality of standard chip models pre-stored thereon, and the controller is further configured to:

send a verification instruction to each of the plurality of chips via the bus in response to determining that each of the plurality of chips is connected to the printer, so as to cause each of the plurality of chips to send its chip model to the controller based on the verification instruction;

compare each chip model with the plurality of standard chip models;

determine, in response to determining that the chip model is identical to any of the plurality of standard chip models, the chip with the chip model as a first chip; and send a verification success message to each first chip to allow the chip and the printer to perform data interaction with each other.

5. The printer according to claim 4, wherein the controller is further configured to:

determine, in response to determining that the chip model is not identical to each of the plurality of standard chip models, the chip with the chip model as second chip; and send a verification failure message to each second chip.

6. The printer according to claim 4, wherein the controller further has a material name and a material remaining amount threshold corresponding to each first chip pre-stored thereon, each first chip has a material remaining amount stored thereon, and the controller is further configured to:

send a material remaining amount acquisition command to each first chip via the bus, so as to cause each first chip to send its material remaining amount stored thereon to the controller; and generate, in response to determining that the material remaining amount stored on the first chip is less than or equal to its corresponding material remaining amount threshold, an alert message based on the material name corresponding to the first chip to alert a user.

7. A non-transitory storage medium having a computer program stored thereon, wherein the computer program, when executed by a processor, causes the processor to:

obtain an actual voltage value of a bus of a printer upon detecting that a plurality of chips connected in parallel become electrically interfacing with the bus, wherein the controller has a voltage threshold pre-stored thereon, wherein the bus has a communication function and is configured to transfer signals between the plurality of chips and the controller of the printer both for connection detection and for subsequent data interaction, and wherein the actual voltage value is generated by a current loop formed between the plurality of chips and the controller via the bus;

compare the actual voltage value with the voltage threshold;

determining, based on a result of the comparing and using the actual voltage value of the bus to determine a connection state of all of the plurality of chips without individually detecting each of the plurality of chips, comprising:

determine that each of the plurality of chips is connected to the printer in response to determining that the actual voltage value is less than or equal to the voltage threshold; and determine that each of the plurality of chips is not connected to the printer in response to determining that the actual voltage value is greater than the voltage threshold;

wherein each of the plurality of chips has a chip model, the controller has a plurality of standard chip models pre-stored thereon, and the computer program, when executed by a processor, further causes the processor to:

send a verification instruction to each of the plurality of chips via the bus in response to determining that each of the plurality of chips is connected to the printer, so as to cause each of the plurality of chips to send its chip model to the controller based on the verification instruction;

compare each chip model with the plurality of standard chip models;

determine, in response to determining that the chip model is identical to any of the plurality of standard chip models, the chip with the chip model as a first chip; and send a verification success message to each first chip to allow the chip and the printer to perform data interaction with each other.

8. The non-transitory storage medium according to claim 7, wherein the computer program, when executed by a processor, further causes the processor to:

determine, in response to determining that the chip model is not identical to each of the plurality of standard chip models, the chip with the chip model as second chip; and send a verification failure message to each second chip.

9. The non-transitory storage medium according to claim 7, wherein the controller further has a material name and a material remaining amount threshold corresponding to each first chip pre-stored thereon, each first chip has a material remaining amount stored thereon, and the computer program, when executed by a processor, further causes the processor to:

send a material remaining amount acquisition command to each first chip via the bus, so as to cause each first chip to send its material remaining amount stored thereon to the controller; and generate, in response to determining that the material remaining amount stored on the first chip is less than or equal to its corresponding material remaining amount threshold, an alert message based on the material name corresponding to the first chip to alert a user.

\* \* \* \* \*